Patented June 15, 1954

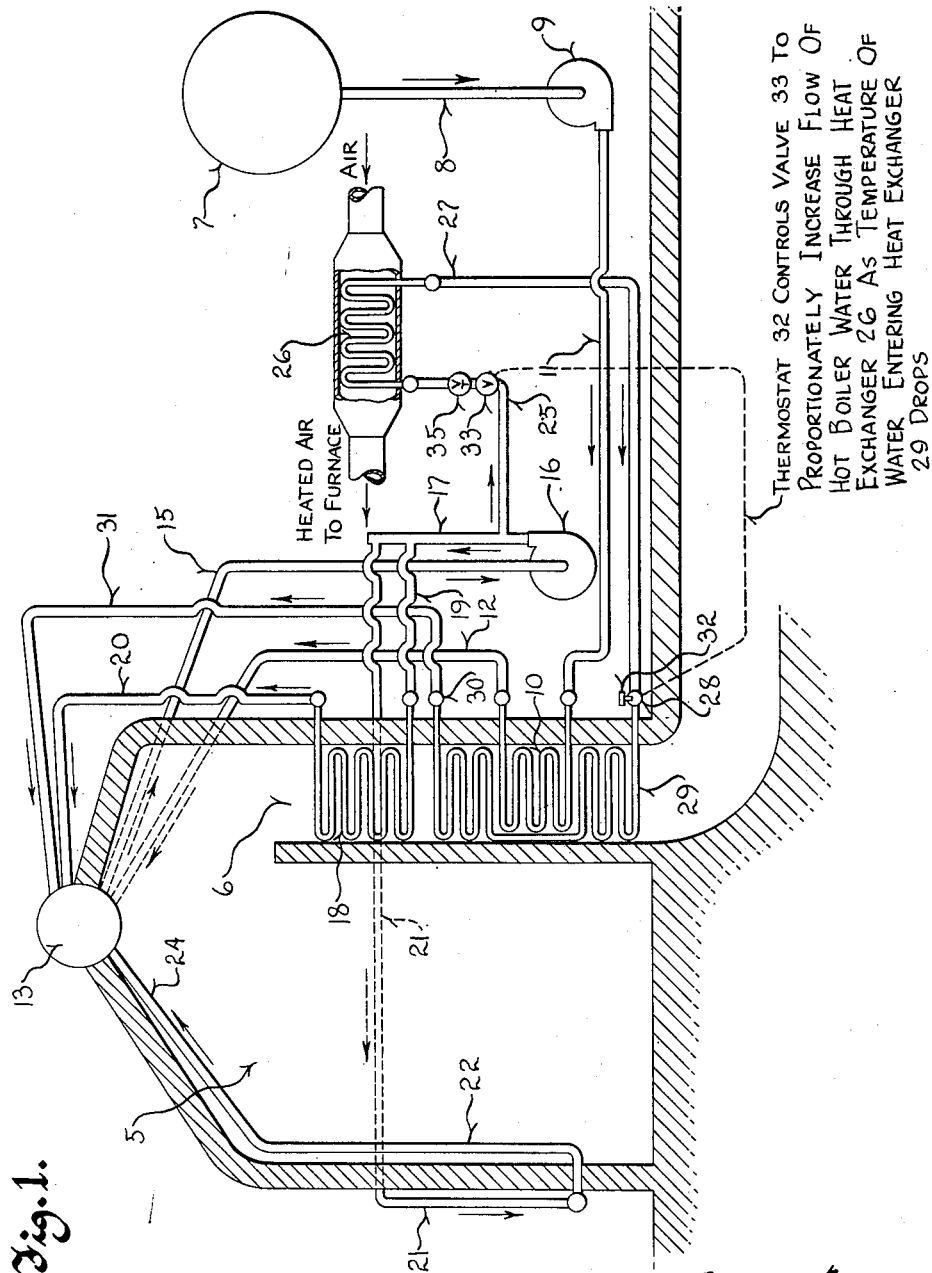

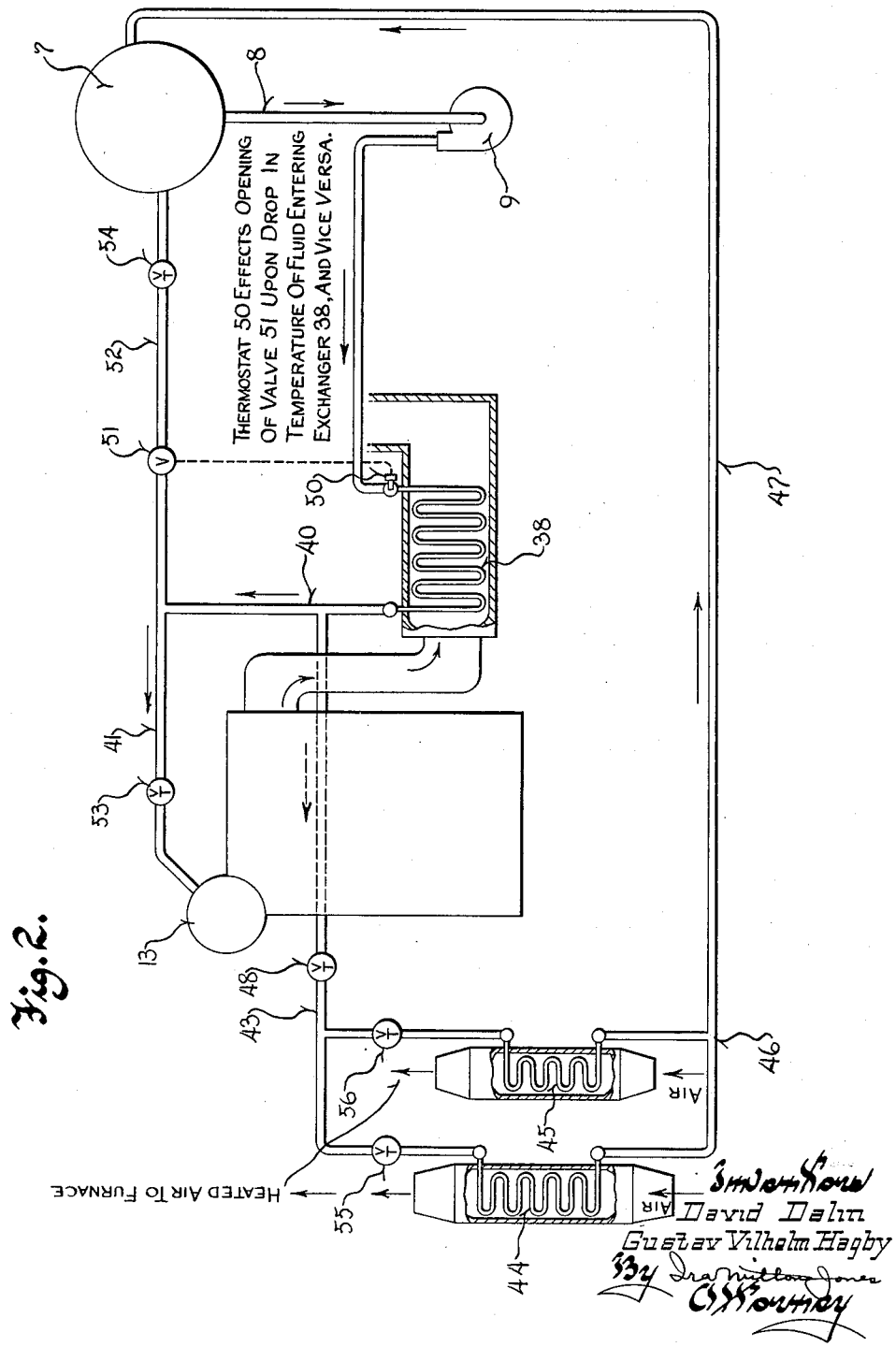

2,681,047

UNITED STATES PATENT OFFICE 2,681,047

METHOD AND MEANS FOR INDIRECT PREHEATING OF CIRCULATING MEDIA UNDER QUANTITATIVE CONTROL

David Dalin, Ronninge, and Gustav Vilhelm Hagby, Ostertalje, Sweden

Application August 19, 1948, Serial No. 45,094

Claims priority, application Sweden August 22, 1947

7 Claims. (Cl. 122—1)

This invention relates to steam generating plants and refers more particularly to the indirect preheating of combustion air for such plants from the hot flue gases.

The copending application of David Dalin and Gustav Vilhelm Hagby, Serial No. 713,438, now Patent No. 2,635,587 issued April 21, 1953, for Method of and Apparatus for Preheating Combustion Air and Feed Water for Steam Generating Plants, deals with the use of an intermediate heat exchange medium for indirectly preheating air for combustion from the flue gases emanating from the furnace of a boiler plant, the heat exchange medium being circulated serially through a primary heat exchanger located in the flue gas pass, in which the medium is heated, and through a secondary heat exchanger located outside the flue gas pass, in which the medium gives up its heat to the combustion air flowing thereacross.

It will be seen that the intermediate heat exchange medium of the aforesaid application flows in a closed circuit and that a separate pump is required to maintain the circulation of the medium therethrough.

By contrast it is an object of this invention to provide a method and means whereby the boiler fluid itself provides the medium for indirectly preheating combustion air for the furnace of a steam boiler from the flue gases emanating from said furnace, so that no pumps are required other than those normally present in a boiler having forced circulation.

The aforesaid copending application also points out that the indirect heating of combustion air has an important advantage over the preheating of combustion air by direct heat exchange with the flue gases, in that indirect preheating precludes condensation upon the surfaces of the heat exchanger located in the flue gas pass of corrosive substances present in the flue gases. When cold air for combustion is passed through a heat exchanger located in the flue gas pass such air tends to cool the surface of the heat exchanger to a temperature below the dew point of the flue gases flowing thereacross. To avoid this result recourse must be had to recirculation of a portion of the preheated air, which expedient partially nullifies the advantages of an air preheater; or, alternatively, the heat exchanger must be made exceedingly heavy and cumbersome to resist the corrosive action of the flue gas condensates.

It is therefore another object of this invention to provide a method and means for preheating combustion air for a boiler plant while at the same time maintaining the temperature of the heat exchanger surfaces located in the flue gas pass above the dew point of the flue gases flowing thereacross.

Another object of this invention resides in the provision of a method and means for indirectly preheating combustion air wherein the temperature of the liquid heating medium entering the primary heat exchanger in the flue gas pass will be kept closely above the dew point temperature of the flue gases throughout a wide range of withdrawal from the boiler with resultant improvement in boiler efficiency.

Still another object of this invention resides in the provision of a method and means for the indirect preheating of combustion air for the furnace of a steam boiler plant wherein the steam dome of the boiler is utilized as an expansion vessel for the heat exchange medium, thereby precluding the necessity for having a separate expansion vessel for said medium.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates two complete examples of the physical embodiments of the invention constructed according to the best mode so far devised for the practical application of the principles thereof, and in which:

Figure 1 is a view diagrammatically illustrating a complete steam generating plant having this invention applied thereto for preheating combustion air; and Figure 2 is a view diagrammatically illustrating a modified embodiment of this invention.

Referring now to the accompanying drawing, and referring more particularly to Figure 1, the numeral 5 designates generally the fire box or combustion chamber of a steam boiler. As is customary, the hot gases resulting from combustion within the fire box are lead off through a gas pass 6, in which are located a number of heat exchangers to be more particularly described hereinafter, and thence are conducted to a stack (not shown).

A vessel 7 outside the furnace body serves as a reservoir for boiler feed water and has an outlet communicated by means of a duct 8 with the inlet of a feed water pump 9. One of the heat exchangers located in the gas pass comprises an economizer 10, the inlet of which is connected by means of a conduit 11 with the outlet of the feed water pump 9 and the outlet of which communicates through another conduit 12 with a steam dome 13, so that the feed water pump draws water from the vessel 7 and circulates it through the economizer 10, where it is preheated by heat exchange with the flue gases, and thence into the steam dome 13.

A conduit 15 connects the outlet of the steam dome with the inlet of a circulating pump 16, the outlet of the pump being connected with a header 17 whence hot boiler fluid drawn from the steam dome by the pump is simultaneously circulated through three circuits.

A portion of the boiler fluid or water expelled from the pump is circulated through convective steaming coils 18 located in the flue gas pass, near the entry thereto, and is therein converted to steam by heat exchange with the hot flue gases emanating from the fire box, the inlet of the convective steaming coils being connected with the header 17 by a duct 19 while a duct 20 conducts the steam from the coils to the steam dome.

From another outlet of the header 17 a duct 21 conducts water to radiant steaming coils 22 which line the walls of the combustion chamber and wherein the water is converted into steam by the radiant heat of combustion. The steam so generated is led back into the steam dome by means of a duct 24 communicating the outlet of the radiant steaming coils with the steam dome.

The remaining portion of the water expelled from the circulating pump 16 is conducted by means of a duct 25 to a secondary heat exchanger coil 26 located outside the flue gas pass and across which air for combustion is adapted to flow on its way to the combustion chamber, to be preheated by heat exchange with the hot water from the steam dome thus circulated through the coil. The outlet from the secondary heat exchanger coil is connected by means of a duct 27 with the inlet header 28 of a primary heat exchanger 29 situated in the flue gas pass, and the outlet of this latter heat exchanger communicates through an accumulating box 30 and a conduit 31 with the steam dome.

It will thus be readily apparent that a portion of the water drawn off from the steam dome by the circulating pump 16 will be circulated serially through the secondary heat exchanger 26 to effect preheating of the combustion air and through the primary heat exchanger 29 to be reheated by the flue gases and thence back to the steam dome.

A thermostat 32 in the intake header 28 of the primary heat exchanger 29, continuously responsive to the temperature of the water entering the primary heat exchanger, governs the position of a valve 33 in the duct 25 to thereby assure that the temperature of the water entering the primary heat exchanger will be sufficiently high at all times to preclude cooling the heat exchanger surfaces of the primary heat exchanger below the dew point temperature of the flue gases flowing thereacross. To this end whenever the temperature of the water entering the header 28 drops below a predetermined value the thermostat 32 effects opening of the valve 33 to increase the amount of water flowing through the secondary heat exchanger coil in proportion to the reduction in temperature of the air flowing over the secondary heat exchanger which caused the objectionable condition.

A throttling valve 35 in the duct 25 between the valve 33 and the inlet of the secondary heat exchanger coil 26 restricts the flow of water through the heat exchanger coil to a predetermined maximum value so that large withdrawals of steam from the boiler system with correspondingly large flow of combustion air to the boiler furnace will not result in an excessive diversion of water to the secondary heat exchanger.

It will thus be seen that in the Figure 1 embodiment of this invention hot water from the steam dome is utilized for preheating combustion air and is thereafter reheated in the primary heat exchanger 29 with the result that circulation of the hot water requires only the usual circulating pump 16 of the boiler system, while at the same time condensation of flue gases on the surfaces of the primary heat exchanger 29 is precluded by reason of the operation of the thermostatically regulated valve 33. It will also be seen that while the system of this invention utilizes a portion of the hot water intended to be converted into steam in the boiler system as the heating medium for the combustion air, the throttling valve 35 nevertheless regulates the amount of hot water diverted to this purpose so that a sufficient quantity thereof will be available for steam generation even at large rates of withdrawal from the boiler.

The Figure 2 embodiment of this invention is particularly adapted to boiler systems wherein the feedwater temperature is extremely low. In this embodiment of the invention the primary heat exchanger 38 in the flue gas pass also constitutes the economizer.

Feedwater from the vessel 7 is withdrawn through a duct 8 to the inlet of a feedwater pump 9 and is circulated thence through the primary heat exchanger 38 where it is heated. Part of the heated water issuing from the outlet of the primary heat exchanger is conveyed directly to the steam dome 13 by means of conduits 40 and 41, while the remainder thereof is diverted by a bifurcated duct 43 to the inlets of a pair of secondary heat exchanger coils 44 and 45 connected in parallel with one another. One of the secondary heat exchangers 44 is adapted to have primary combustion air for the furnace passed thereacross to be preheated thereby, while the other secondary heat exchanger 45 preheats the secondary combustion air.

The outlets of the secondary heat exchanger coils 44 and 45 are interconnected as at 46, and a duct 47 provides a return flow path from the secondary heat exchanger coils to the feedwater vessel.

It will thus be seen that in the Figure 2 embodiment of this invention the water whereby the combustion air is preheated is circulated from the feedwater vessel through a primary heat exchanger coil 38, where it is heated, thence through the secondary heat exchangers 44 and 45 and back to the feedwater vessel for recirculation, reheating of the cooled water which has passed through the secondary heat exchangers being effected upon recirculation thereof. It will also be apparent that this circulation is effected by means of the usual feedwater pump 9, no pumps other than those heretofore usually present in a forced circulation boiler system being necessary.

As in the case of the Figure 1 embodiment, a throttling valve 48 in the duct 43 ahead of the secondary heat exchanger coils 44 and 45 limits the flow of water through said coils to a predetermined maximum value to preclude excessive diversion of feedwater during periods of large withdrawal from the boiler.

A thermostat 50 situated in the inlet of the primary heat exchanger 38 responds to the temperature of the feedwater entering the primary heat exchanger and governs the operation of a control valve 51 in a return duct 52 which communicates the conduit 41 with the feedwater vessel. When the temperature of the feedwater entering the primary heat exchanger coil drops below the value at which condensation will form on the primary heat exchanger surfaces, the valve 51 opens to allow a portion of the preheated feedwater to return to the vessel 7 to thereby raise the temperature of the feedwater entering the primary heat exchanger coil.

A restrictor 53 in the conduit 41 through which preheated feedwater is delivered to the steam dome provides a sufficient amount of back pressure to encourage such recirculation, while a throttling valve 54 in the return duct 52 restricts the amount of water so recirculated to a predetermined maximum value, and cooperates with the throttling valve 48 in the duct 43 leading to the secondary heat exchangers to insure the flow of an adequate supply of feedwater to the steam dome during periods of large boiler withdrawal.

It will, of course, be understood that if desired only one secondary heat exchanger may be placed in the circuit hereinbefore described, for preheating only primary combustion air, but where two are employed as described control valves 55 and 56 are provided to properly proportion flow of boiler fluid through the two exchangers.

From the foregoing description taken together with the accompanying drawing it will be readily apparent that this invention provides a method and means for indirectly preheating combustion air for a steam boiler from the hot flue gases of the boiler furnace without using any pumps other than those heretofore normally present in forced circulation boiler systems while at the same time constantly maintaining the temperature of the heat exchange surfaces of the primary heat exchanger above the dew point of the flue gases.

What we claim as our invention is:

1. The method of indirectly preheating combustion air being fed to the combustion chamber of a steam boiler plant from the hot flue gases in its gas pass which comprises the steps of: circulating a portion of the boiler water flowing in the boiler system through a secondary heat exchanger located outside the flue gas pass; passing the combustion air flowing to the combustion chamber across said secondary heat exchanger to preheat said air; returning the boiler water from said secondary heat exchanger to the boiler system and in the course of returning it to the boiler system reheating the boiler water in a primary heat exchanger located in the flue gas pass; and controlling the flow of the boiler water through the secondary heat exchanger as required to assure that the boiler water entering said primary heat exchanger will at all times have a temperature above the dew point of the flue gases flowing thereacross.

2. The method of indirectly preheating air for combustion for a steam boiler plant from hot flue gases in its gas pass which comprises the steps of: passing boiler feed water from a feed water source through a primary heat exchanger located in the flue gas pass to thereby preheat the water; diverting a portion of the water so preheated through a secondary heat exchanger located outside the flue gas pass and circulating the preheated water therethrough; conducting the remainder of the water so preheated to the boiler fluid circulating system of the boiler and back to the feed water source; passing air for combustion across said secondary heat exchanger to preheat said air; and returning the water passed through said secondary heat exchanger to the feed water source.

3. In a steam generating plant of the type having a flue gas duct leading from its combustion chamber, an air duct through which air for sustaining combustion flows, and a steam dome, means for utilizing the heat of the flue gases flowing through the flue gas duct for indirectly preheating combustion air being fed to the combustion chamber through said air duct, said means comprising: a primary heat exchanger in the flue gas duct; a secondary heat exchanger in the air duct; a pump; means for supplying boiler water to the inlet of the pump; means connecting the outlet of said pump serially with the heat exchangers; branch means also connecting the outlet of said pump with the steam dome; thermo-responsive control means responsive to temperature of the water entering the primary heat exchanger; means governed by the thermo-responsive control means for controlling the relative proportions in which water flows through the secondary heat exchanger and to the steam dome to thereby control the amount of heat abstracted from the water by the combustion air and maintain the temperature of water entering the primary heat exchanger above the dew point of the flue gases.

4. A steam generating plant of the type having a flue gas duct leading from its combustion chamber, a primary heat exchanger in said flue gas duct for heating boiler water circulated therethrough, an air duct through which air for sustaining combustion flows, a secondary heat exchanger in said air duct and through which heated boiler water may flow for heat exchange with the combustion air, a pump, and ducts connected with the pump and with the primary and secondary heat exchangers for circulating boiler water from a source thereof serially through said heat exchangers, said steam generating plant being characterized by: thermo-responsive control means positioned to be influenced by the temperature of said boiler water entering the primary heat exchanger means; means connected with said ducts for diverting a portion of the boiler water flowing to said secondary heat exchanger means back to said source; and means governed by said thermo-responsive control means for automatically proportioning the relative rates at which water is circulated to said secondary heat exchanger and returned to said source.

5. A steam generating plant of the type having a flue gas duct leading from its combustion chamber, a primary heat exchanger in said flue gas duct for heating boiler water circulated therethrough, an air duct through which air for sustaining combustion flows, a secondary heat exchanger in said air duct and through which heated boiler water may flow for heat exchange with the combustion air, a steam dome, a pump, and ducts connected with the pumps and with the steam dome and the primary and secondary heat exchangers for circulating boiler water from the steam dome serially through said secondary and primary heat exchangers, said steam generating plant being characterized by: thermo-responsive control means positioned to be influenced by the temperature of said boiler water entering the primary heat exchanger means; means connected with said ducts for diverting a portion of the boiler water flowing to said secondary heat exchanger means back to the steam dome; means governed by said thermo-responsive control means for automatically proportioning the relative rates at which water is circulated to said secondary heat exchanger and returned to said source; and means for heating the boiler water being returned to the steam dome.

6. A steam generating plant of the type having a flue gas duct leading from its combustion chamber, a primary heat exchanger in said flue gas duct for heating boiler water circulated therethrough, an air duct through which air for sustaining combustion flows, a secondary heat exchanger in said air duct and through which heated boiler water may flow for heat exchange with the combustion air, a steam dome, a feed water reservoir, a pump, and ducts connected with the pump and with the steam dome, the feed water reservoir and the primary and secondary heat exchanger for circulating boiler water from the feed water reservoir serially through said primary and secondary heat exchangers, said steam generating plant being characterized by: thermo-responsive control means positioned to be influenced by the temperature of said boiler water entering the primary heat exchanger; said ducts connecting the outlet of the primary heat exchanger with the inlet of the secondary heat exchanger and also with the steam dome and the feed water reservoir; and means governed by said thermo-responsive control means for automatically proportioning the relative rates at which water is circulated to said secondary heat exchanger and discharged into the steam dome and returned to the feed water reservoir.

7. The method of indirectly preheating combustion air being fed to the combustion chamber of a steam boiler plant from the hot flue gases in its gas pass, which comprises the steps of: pumping boiler water through a primary heat exchanger located in the flue gas pass to thereby heat the same and abstract heat from the flue gas; passing a portion of the boiler water so heated through a secondary heat exchanger located outside the flue gas pass and in heat exchange relation with the combustion air flowing to the combustion chamber of the boiler plant to thereby preheat said air; bypassing the remainder of said heated boiler water past the secondary heat exchanger and conducting it to the boiler fluid circulating system; and automatically controlling the proportion of the heated boiler water flowing through said secondary heat exchanger and that bypassing the same in accordance with the temperature of the boiler water entering the primary heat exchanger to thereby maintain the temperature of the boiler water entering the primary heat exchanger above a predetermined dew point of the flue gases in the flue gas pass.

References Cited in the file of this patent

UNITED STATES PATENTS

| Number | Name | Date |
|---|---|---|
| 413,901 | Blanchard | Oct. 29, 1889 |
| 444,976 | Dodge | Jan. 20, 1891 |
| 1,235,928 | Sargent | Aug. 7, 1917 |
| 1,612,854 | Broido | Jan. 4, 1927 |
| 1,703,093 | Brown | Feb. 26, 1929 |
| 1,833,130 | Roe | Nov. 24, 1931 |
| 1,975,519 | Rudorff | Oct. 2, 1934 |
| 2,026,399 | Pierce | Dec. 31, 1935 |
| 2,170,345 | Bailey et al. | Aug. 22, 1939 |
| 2,320,911 | Cooper | June 1, 1943 |

FOREIGN PATENTS

| Number | Country | Date |
|---|---|---|
| 434,112 | Germany | Sept. 18, 1926 |
| 596,537 | Germany | May 7, 1934 |